US012755951B2

(12) United States Patent
Covey et al.

(10) Patent No.: US 12,755,951 B2
(45) Date of Patent: Oct. 6, 2026

(54) EXHAUST FLOW BOOSTING FOR SAMPLING PROBE FOR USE IN MASS SPECTROMETRY SYSTEMS AND METHODS

(71) Applicant: DH Technologies Development Pte. Ltd., Singapore (SG)

(72) Inventors: Thomas Covey, Concord (CA); Peter Kovarik, Markham (CA)

(73) Assignee: DH Technologies Development Pte. Ltd., Singapore (SG)

( * ) Notice: Subject to any disclaimer, the term of this patent is extended or adjusted under 35 U.S.C. 154(b) by 142 days.

(21) Appl. No.: 18/031,240

(22) PCT Filed: Oct. 11, 2021

(86) PCT No.: PCT/IB2021/059297
§ 371 (c)(1),
(2) Date: Apr. 11, 2023

(87) PCT Pub. No.: WO2022/079573
PCT Pub. Date: Apr. 21, 2022

(65) Prior Publication Data
US 2023/0377867 A1 Nov. 23, 2023

Related U.S. Application Data

(60) Provisional application No. 63/091,160, filed on Oct. 13, 2020.

(51) Int. Cl.
*H01J 49/04* (2006.01)
*H01J 49/16* (2006.01)

(52) U.S. Cl.
CPC .......... *H01J 49/045* (2013.01); *H01J 49/167* (2013.01)

(58) Field of Classification Search
CPC .... H01J 49/045; H01J 49/167; H01J 49/0404; H01J 49/0431
See application file for complete search history.

(56) References Cited

U.S. PATENT DOCUMENTS 6,511,850 B1 * 1/2003 Vigh ................ G01N 27/44717 261/78.2
8,622,715 B1 * 1/2014 Lott .......................... F04F 5/46 417/198
2006/0255261 A1 * 11/2006 Whitehouse .......... H01J 49/165 250/288

(Continued)

OTHER PUBLICATIONS

Berkel et al., "An open port sampling interface for liquid introduction atmospheric pressure ionization mass spectrometry", Rapid Communications in Mass Spectrometry, vol. 29, No. 19, pp. 1749-1756.

(Continued)

*Primary Examiner* — David E Smith
*Assistant Examiner* — Laura Eloise Tandy

(57) ABSTRACT

Methods and systems for delivering a liquid sample to an ion source for the generation of ions and subsequent analysis by mass spectrometry are provided herein. In accordance with various aspects of the present teachings, MS-based systems and methods are provided in which a specimen may be received within an open port of a sampling probe and continuously delivered via a jet pump assembly to an ion source for subsequent mass spectrometric analysis.

19 Claims, 4 Drawing Sheets

(56) References Cited

U.S. PATENT DOCUMENTS

| | | | | |
|---|---|---|---|---|
| 2009/0045330 | A1* | 2/2009 | Wang | H01J 49/044 250/288 |
| 2009/0212210 | A1* | 8/2009 | Finlay | H01J 49/26 250/288 |
| 2012/0083045 | A1* | 4/2012 | Van Berkel | G01N 1/32 422/68.1 |
| 2014/0353495 | A1* | 12/2014 | Inagaki | H01J 49/105 239/398 |
| 2016/0172178 | A1* | 6/2016 | Apffel | H01J 49/168 250/336.1 |
| 2017/0178884 | A1* | 6/2017 | Murtazin | G01J 3/443 |
| 2019/0157061 | A1* | 5/2019 | Datwani | B01L 3/0268 |
| 2019/0234837 | A1* | 8/2019 | Van Berkel | H01J 49/0431 |

OTHER PUBLICATIONS

Anonymous, "Vacuum ejector—Wikipedia", Wikipedia, (Jul. 17, 2020), pp. 1-3, URL: https://en.wikipedia.org/w/index.php?title=Vacuum_ejector&oldid=968089398, (Dec. 17, 2021), XP055874249.

International Search Report and Written Opinion, PCT/IB2021/059297, Dated Jan. 5, 2022, pp. 12.

Zhou L et al, "Incorporation of a Venturi Device in Electrospray Ionization", Analytical Chemistry, American Chemical Society, US, (Nov. 1, 2003), vol. 75, No. 21, doi:10.1021/AC020786E, ISSN 0003-2700, pp. 5978-5983, XP001047340.

* cited by examiner

EXHAUST FLOW BOOSTING FOR SAMPLING PROBE FOR USE IN MASS SPECTROMETRY SYSTEMS AND METHODS

RELATED APPLICATIONS

This application is a 35 U.S.C. 371 national stage filing of International Application No. PCT/IB2021/059297, filed on Oct. 11, 2021, which claims priority to U.S. provisional application No. 63/091,160 filed on Oct. 13, 2020, entitled "Exhaust Flow Boosting for Sampling Probe for Use in Mass Spectrometry Systems and Methods," which is incorporated herein by reference in its entirety.

FIELD

The present teachings generally relate to mass spectrometry, and more particularly to sampling interfaces for mass spectrometry systems and methods.

BACKGROUND

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of an analyte of interest. Such pre-analytical steps can include sample collection and preparation (e.g., separation of the analyte from the matrix, concentration, fractionation and, if necessary, derivatization). By way of example, it is common to purify and/or separate analytes using high-performance liquid chromatography (HPLC) prior to MS analysis, though such steps may decrease throughput, introduce potential sources of error, and/or increase dilution. It has been estimated, for example, that more than 80% of the overall analytical process can be spent on sample collection and preparation in order to enable the analyte's detection via MS or to remove potential sources of interference contained within the sample matrix.

As exemplified in an article entitled "An open port sampling interface for liquid introduction atmospheric pressure ionization mass spectrometry" in the Rapid Communications in Mass Spectrometry, 29(19):1749-1756 (the teachings of which are incorporated in its entirety), Van Berkel et al. have introduced a sampling interface that allows for the introduction of sample droplets and/or solid-phase microextraction (SPME) devices into a solvent of a sampling port that is open to the atmosphere, and which can be coupled directly to the ion source of an MS system. Generally, SPME devices include a substrate having a surface that is coated with an extracting phase to which analytes within the sample can be preferentially adsorbed when the device is inserted into the sample, essentially integrating sampling, sample preparation, and extraction into a single step. For example, extraction of analytes of interest can take place in situ by inserting a biocompatible SPME device directly into tissue, blood, or other biological matrix for a short period of time. Additionally, SPME devices can be used for ex vivo analysis using a small amount of a collected sample (e.g., a sample aliquot). Though potentially reducing complex sample preparation (e.g., by eliminating the use of HPLC), use of such sampling interfaces like that described by Van Berkel may nonetheless suffer from limitations arising from the specimen being provided to an "open port" in which the solvent interfaces with air (e.g., at atmospheric pressure) and provides the flow driving force.

Accordingly, there remains a need for improved open port sampling interfaces and systems incorporating the same.

SUMMARY

Methods and systems for delivering a liquid sample to an ion source for the generation of ions and subsequent analysis by mass spectrometry are provided herein. In accordance with various aspects of the present teachings, MS-based systems and methods are provided in which a specimen containing one or more analytes of interest (e.g., a liquid sample droplet, a SPME substrate) may be received within an open port and continuously delivered to an ion source for subsequent mass spectrometric analysis (e.g., without a LC column between the sampling interface and the ion source). In some conventional open port systems, a nebulizer gas (commonly used to generate and shape the spray plume during discharge from an ESI source) may also be used to drive the flow from the open port via the Venturi effect. In such conventional systems, however, the flow rates and/or the viscosity of liquids utilized in the open port sampling interfaces may be limited due to the pressure difference generated by the gas driven Venturi effect between the open port and the nebulizer nozzle. Unlike such conventional systems, methods and systems in accordance with various aspects of the present teachings utilize a jet pump assembly (e.g., an eductor pump) to enable sampling from such an open port even against higher flow resistances and at higher flow rates, while minimally diluting the analytes. In various aspects, the flow from the open port's sampling space may be adjusted (e.g., increased) via the addition of a "motive" flow downstream from the liquid exhaust conduit of the open port. Contrary to a conventional merger of an additional flow into an existing stream which may result in flow reduction or even a flow reversal of the existing stream upstream of the merger, the present teachings utilize a jet flow entrainment process to increase flow of the existing stream upstream of the merge. That is, the addition of the motive flow downstream of the exhaust conduit is nonetheless effective to increase the flow therethrough (and from the open port). As such, methods and systems in accordance with various aspects of the present teachings can substantially dissociate the fluid flow within the sampling interface from the provision of nebulizer gas, thereby allowing both the sampling conditions (e.g., flow rate of sample liquid) and the ionization conditions (e.g., flow rate of nebulizer gas) to be better optimized for their distinct functions.

In accordance with various aspects of the present teachings, a system for analyzing a chemical composition of a specimen is provided, the system comprising a sampling probe having an open port containing liquid within which a specimen may be received and a jet pump assembly for delivering a sample mixture comprising the liquid and a motive fluid to an ion source for ionization thereby, and ultimately, for mass spectrometric analysis. In various aspects, the sampling probe can comprise an outer housing having an open end and a liquid supply conduit within the housing, the liquid supply conduit extending from an inlet end (e.g., configured to be coupled to a liquid supply source) to an outlet end configured to deliver liquid to a sampling space at the open end of the housing. The sampling space comprises a liquid-air interface for receiving a specimen within the liquid in the sample space. The sampling probe can also comprise a liquid exhaust conduit within the housing that extends from an inlet end configured to transport liquid from the sampling space to an outlet end. The system can also include a jet pump body defining a suction chamber in fluid communication with the outlet end of the liquid exhaust conduit and a nozzle configured to discharge a motive fluid into the suction chamber at a pressure greater than about one atmosphere. A sample conduit extends from the suction chamber to an outlet end and is configured to transport a sample mixture from the suction chamber to an ionization chamber in communication with a sampling orifice of a mass spectrometer, wherein discharge of the motive fluid into the suction chamber is configured to draw liquid from the liquid exhaust conduit so as to form the sample mixture. In various aspects, the motive fluid can be in a liquid state, a gas state, or a mixture thereof.

The ion source can have a variety of configurations in accordance with the present teachings but may, in some aspects, be configured to discharge the sample mixture into the ionization chamber while an electric field is generated therein. For example, in a typical ESI process, a liquid sample is continuously discharged into an ionization chamber from within an electrically conductive capillary, while an electric potential difference between the capillary and a counter electrode generates a strong electric field within the ionization chamber that electrically charges the liquid sample. This electric field causes the liquid discharged from the capillary to disperse into a plurality of charged micro-droplets drawn toward the counter electrode if the charge imposed on the liquid's surface is strong enough to overcome the surface tension of the liquid (i.e., the particles attempt to disperse the charge and return to a lower energy state). As solvent within the micro-droplets evaporates during desolvation in the ionization chamber, charged analyte ions can then enter a sampling orifice of the counter electrode for subsequent mass spectrometric analysis. In some example aspects, the outlet end of the sample conduit extends into the ionization chamber and is electrically conductive, for example, such that an electric potential may be applied to the outlet end of the sample conduit as the sample mixture is discharged therefrom. Alternatively, in some aspects, the outlet end of the sample conduit can be configured to couple to an ion source probe (e.g., an electrically conductive capillary) for discharging the sample mixture into the ionization chamber.

The sample conduit extending from the suction chamber can have a variety of configurations, but as noted above is configured to transport a sample mixture from the suction chamber to an ionization chamber in communication with a sampling orifice of a mass spectrometer. In some example aspects, the sample conduit can comprise a converging portion extending from an upstream end adjacent the suction chamber to a downstream end and exhibiting a decreasing cross-sectional area along a length thereof. For example, the converging portion can exhibit a decreased cross-sectional area relative to a cross-sectional area of the suction chamber. In some related aspects, the sample conduit may further comprise a diffuser portion extending from an upstream end to a downstream end and exhibiting an increasing cross-sectional area along a length thereof, the diffuser portion being disposed downstream of the converging portion. Additionally or alternatively, in some aspects, the sample conduit may comprise a throat downstream of the converging portion. For example, the sample conduit may comprise a throat between the converging portion and a diffuser portion, the throat exhibiting a substantially constant cross-sectional area along a length thereof, which may be less than a cross-sectional area of the upstream end of the converging portion and a downstream end of the diffuser portion.

In various aspects, the nozzle can be configured to operate at higher pressure and provide a high velocity jet of motive fluid axially toward the sample conduit. In some example aspects, the nozzle may be configured to discharge the motive fluid into the suction chamber at a drive pressure in a range from about 0.1 pounds per square inch (psi) to about 15,000 psi (e.g., at about 1000 psi, at about 10,000 psi, from about 0.1 psi to about 10,000 psi, from about 1000 psi to about 10,000 psi). In some related aspects, the system may also comprise a pressure regulator configured to adjust the pressure of the motive fluid discharged into the suction chamber.

In various aspects, a pressure of the sample mixture within at least a portion of the sample conduit can be greater than one atmosphere. For example, in some aspects the pressure of the sample mixture within the portion of the sample conduit can be in a range from about 0.1 psi to about 10,000 psi (e.g., about 1000 psi, from about 0.1 psi to about 1000 psi).

In various aspects, the system may be configured such that the volumetric flow rate of motive fluid through the nozzle is less than the volumetric flow rate of the liquid through the outlet end of the exhaust conduit. Alternatively, in some aspects, the motive flow rate may be equal or larger than the flow through the exhaust conduit.

Sampling probes in accordance with the present teachings can have a variety of configurations. For example, in some aspects, the sampling probe can comprise an inner capillary tube at least partially disposed within the outer housing, wherein said inner capillary tube defines one of the supply conduit and the exhaust conduit, and wherein a space between an outer wall of the inner capillary tube and an inner wall of the outer housing defines the other of the supply conduit and the exhaust conduit. In some related aspects, for example, the outer housing can also comprise an outer capillary tube extending from a proximal end to a distal end adjacent to the sampling space. In various aspects, the inner and outer capillary tube can be coaxial. Additionally or alternatively, a distal end of the inner capillary tube can be recessed relative to the distal end of the outer housing.

In accordance with the present teachings, the sampling space can be configured to receive a variety of specimens within the liquid contained therein. For example, the specimen can comprise a fluid droplet (e.g., dropped/propelled onto the liquid/air interface) or a sample substrate. By way of example, the sample substrate can have one or more analytes adsorbed thereto, and wherein the liquid supply source comprises desorption solvent configured to desorb the one or more analytes from the sample substrate.

As detailed below, the system can comprise one or more of the ion source probe, the ionization chamber, and the mass spectrometer system, wherein the ion source probe is in fluid communication with the outlet end of the sample conduit and comprises a terminal end disposed in the ionization chamber, wherein analytes contained within said sample mixture are configured to ionize as the sample mixture is discharged into the ionization chamber.

Methods for performing chemical analysis are also provided herein. In accordance with various aspects of the present teachings, a method for performing chemical analysis of a specimen can comprise inserting the specimen into liquid within a sampling space of a sampling probe, the sampling probe comprising: an outer housing having an open end; a liquid supply conduit within the housing, the liquid supply conduit extending from an inlet end for coupling to a liquid supply source to an outlet end configured to deliver liquid to the sampling space at the open end of the housing, wherein the sampling space comprises a liquid-air interface through which the specimen is received within the liquid; and a liquid exhaust conduit within the housing, the liquid exhaust conduit extending from an inlet end configured to transport liquid from the sampling space to an outlet end. The method can further comprise entraining the liquid from the outlet end of the liquid exhaust conduit within a motive fluid to form a sample mixture and discharging said sample mixture into an ionization chamber so as to ionize one or more analyte species within the sample mixture. Mass spectrometric analysis can then be performed on the ionized analyte specie(s).

In some aspects, entraining the liquid from the outlet end of the liquid exhaust conduit within a motive fluid to form a sample mixture can comprise discharging the motive fluid into a suction chamber of a jet pump body through a nozzle at a pressure greater than about one atmosphere so as to draw liquid from the liquid exhaust conduit into the suction chamber and transporting the sample mixture through a sample conduit extending from the suction chamber to an outlet end. The sample conduit extending from the suction chamber can have a variety of configurations. For example, in some aspects, the sample conduit comprises a converging portion exhibiting a decreasing cross-sectional area along a length thereof, a downstream end of the converging portion exhibiting a decreased cross-sectional area relative to a cross-sectional area of the suction chamber. Additionally, in some example aspects, the sample conduit can comprise a diffuser portion downstream of the converging portion, the diffuser portion exhibiting an increasing cross-sectional area along a length thereof. Additionally, the sample conduit can in some aspects comprise a throat between the converging portion and the diffuser portion, the throat exhibiting a substantially constant cross-sectional area along a length thereof, the throat exhibiting a decreased cross-sectional area relative to a cross-sectional area of an upstream end of the converging portion and a downstream end of the diffuser portion.

In certain aspects, the nozzle can be configured to discharge the motive fluid into the suction chamber at a drive pressure in a range from about 0.1 psi to about 15,000 psi. In some related aspects, the method can further comprise adjusting the pressure of the motive fluid discharged into the suction chamber.

In various aspects, a pressure of the sample mixture within at least a portion of the sample conduit can be greater than one atmosphere. For example, the pressure of the sample within said portion of the sample conduit is in a range from about 0.1 psi to about 10,000 psi (e.g., about 1000 psi, from about 0.1 psi to about 1000 psi).

In various aspects, the volumetric flow rate of the motive fluid through the nozzle can be less than the volumetric flow rate of the liquid through the outlet end of the exhaust conduit. Alternatively, in various aspects, the volumetric flow rate of the motive fluid through the nozzle can be equal to or greater than the volumetric flow rate of the liquid through the outlet end of the exhaust conduit.

The specimen received within the sampling space can have a variety of configurations but generally comprises one or more analytes of interest. By way of example, the specimen can comprise a fluid droplet containing or suspected of containing the one or more analytes of interest (e.g., following one or more pre-treatment or purification steps). Alternatively, the specimen can be a sample substrate (e.g., a SPME substrate) having one or more analytes adsorbed thereto, and the liquid supply source can provide a desorption solvent such that insertion of the specimen into the desorption solvent within the sampling space is effective to desorb the one or more analytes from the sample substrate.

In various aspects, the sampling probe can comprise an inner capillary tube at least partially disposed within the outer housing, wherein said inner capillary tube defines one of the supply conduit and the exhaust conduit and a space between an outer wall of the inner capillary tube and an inner wall of the outer housing defines the other of the supply conduit and the exhaust conduit. In some related example aspects, the outer housing can comprise an outer capillary tube extending from a proximal end to a distal end adjacent to the sampling space. In various aspects, a distal end of the inner capillary tube is recessed relative to the distal end of the outer housing.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

Figure 1:
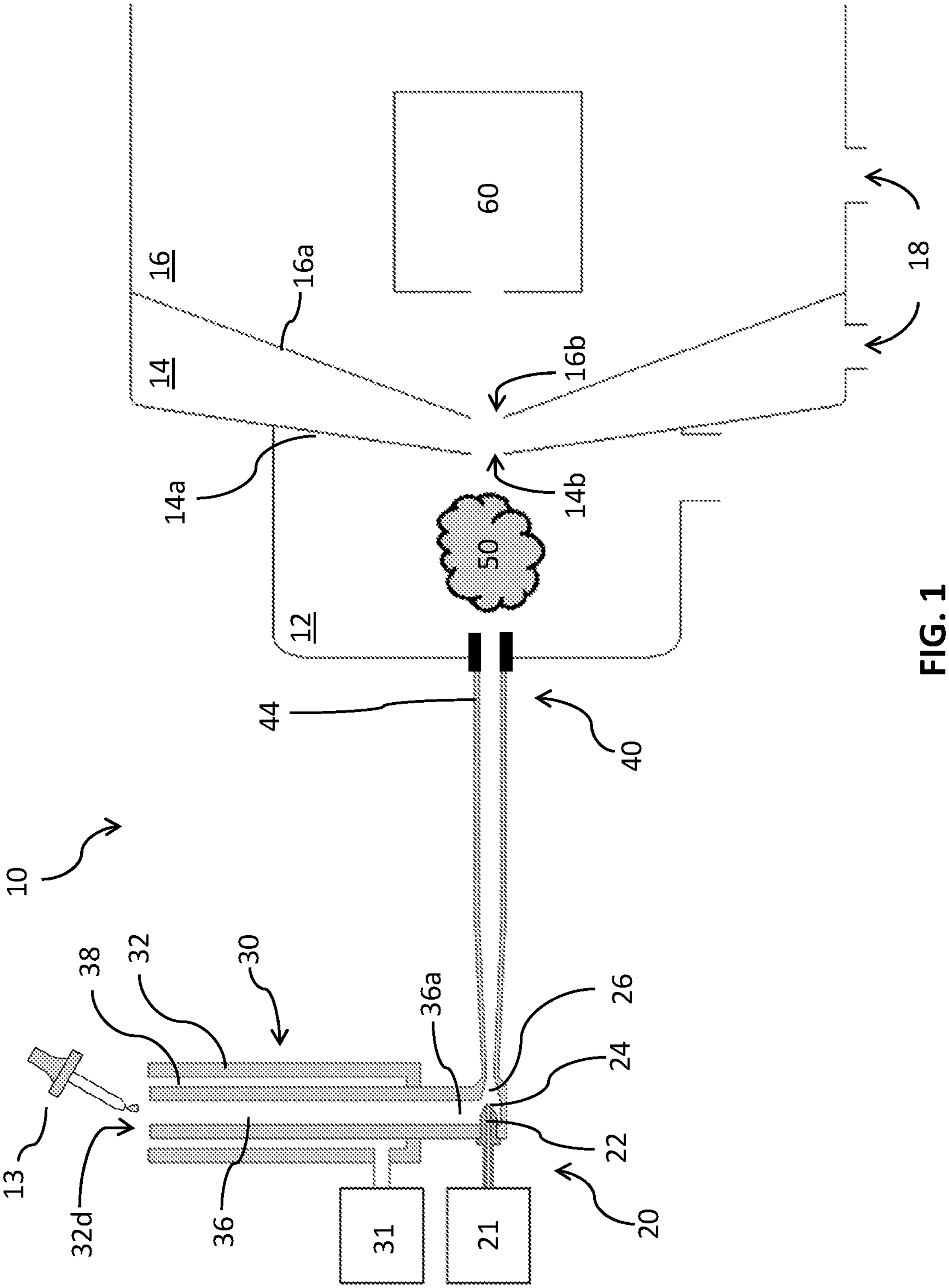
FIG. 1, in a schematic diagram, illustrates an exemplary system comprising a sampling probe having a liquid/air interface and a jet pump assembly fluidly coupled to an electrospray ion source of a mass spectrometer system in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means 10% greater or lesser than the value or range of values stated or the complete condition or state. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

The present teachings are generally directed to methods and systems for delivering a liquid sample to an ion source for the generation of ions and subsequent MS-based analysis. In accordance with various aspects of the present teachings, the methods and systems exemplified herein provide for a specimen containing one or more analytes of interest (e.g., a liquid sample droplet, a SPME substrate) to be received within an open port of a sampling interface and allow for a sample mixture containing the analyte(s) of interest to be continuously delivered to an ion source for subsequent mass spectrometric analysis. In particular, a jet pump assembly may be provided between the sampling space of the sampling interface and the ionization chamber (both of which may substantially be at atmospheric pressure) to generate the sample mixture that is delivered to the ion source. Though each of the sampling space and ionization may substantially be at atmospheric pressure, the jet pump assembly may reliably and continuously deliver sample mixtures having a variety of viscosities at a variety of flow rates, while minimally diluting the analytes. Such delivery of the sample mixture can also be provided without substantially relying on the suction provided by a nebulizer gas at the discharge end of the ion source, thereby allowing both the flow rate of the sample liquid and the flow rate of the nebulizer gas to be independently adjusted to address their intended functions. That is, methods and systems in accordance with various aspects of the present teachings provide sampling interfaces configured to increase the sensitivity of analysis, for example, by enabling optimized fluid flow rates (e.g., about the coated surface of a sample substrate to which the analyte(s) of interest may be adsorbed) and/or increases in throughput. It will be appreciated by a person skilled in the art in light of the present teachings, for example, that considerations such as desired fluid flow rate within and from the sampling space can be adjusted and/or optimized without adjusting the flow of nebulizer gas to maintain desorption kinetics to ensure sufficiently rapid desorption (so as to provide sharper peaks in MS data, for example, without tailing), reduced dilution (e.g., by providing desorption into a reduced volume of solvent), thereby improving instrument response and sensitivity, but without adjusting the flow of nebulizer gas. Additionally, in various aspects, the systems and methods described herein can eliminate the need for one or more time-consuming sample preparation steps while enabling fast coupling of sample substrates to the MS system (and fast desorption therefrom), with minimal alterations to the front-end of known systems, while nonetheless maintaining sensitivity, simplicity, selectivity, speed, and throughput. Moreover, in various aspects, the present teachings can enable a fully- or partially automated workflows, thereby further increasing throughput while potentially eliminating sources of human error in the analysis of SPME-derived samples.

FIG. 1 schematically depicts an embodiment of an exemplary system 10 in accordance with various aspects of the applicant's teachings for ionizing and mass analyzing analytes from a specimen received through a liquid/air interface of a sampling probe. As shown in FIG. 1, the system 10 generally includes a sampling probe 30 (e.g., an open port probe) in fluid communication with an ion source 40 for discharging a sample mixture containing one or more sample analytes into an ionization chamber 12, and a mass analyzer 60 in fluid communication with the ionization chamber 12 for downstream processing and/or detection of ions generated by the ion source. A jet pump assembly 20 having a mixing chamber fluidically disposed in the fluid pathway between the sampling probe 30 and the ionization chamber 12 is configured to assist the transport of analytes contained within the fluid of the sampling probe 30 to the ion source 40.

The sampling probe 30 generally comprises an outer housing 32 having an end **32*d* that is open to the atmosphere and through which a specimen comprising one or more analytes of interest can be received. As shown, for example, a droplet from dropper 13 may be provided into the open end 32*d* of the sampling probe for transporting analytes within the droplet to the ion source 40** as discussed otherwise herein.

A liquid supply conduit 38 within the outer housing 32 extends from an inlet end configured to be coupled to a liquid supply source 31 to an outlet end configured to deliver liquid from the liquid supply source 31 to the open end **32*d*. The liquid provided to the open end 32*d* via the liquid supply conduit 38 can be any suitable liquid amenable to the ionization process, including water, methanol, and acetonitrile, all by way of non-limiting example. In some aspects, for example, when the specimen comprises a sample substrate to which analytes are adsorbed, the liquid can be a desorption solvent effective to also desorb analytes from the sample substrate (e.g., a SPME substrate). The liquid supply source 31 can be any suitable source (e.g., a container, reservoir, etc.) and a pumping mechanism (not shown in FIG. 1) can be provided to pump the liquid from the source 31 to the open end 32*d* via the liquid supply conduit 38 at a selected volumetric flow rate. Example pumping mechanisms include HPLC pumps, reciprocating pumps, positive displacement pumps such as rotary, gear, plunger, piston, peristaltic, diaphragm pump, and other pumps such as gravity, impulse and centrifugal pumps, all by way of non-limiting example. As discussed in detail below, the pumping mechanism can be configured to provide liquid to the open end 32*d*** at a selected volumetric flow rate.

The housing 32 also includes a liquid exhaust conduit 36 that extends from the open end **32*d* to an outlet end 36*a* such that liquid containing the analytes can be transported from the open end 32*d* within the housing 32. It will be appreciated in light of the present teachings that the arrangement of the liquid supply conduit 38 and the liquid exhaust conduit 36 can be varied. For example, though the liquid exhaust conduit 36 is depicted as being within (e.g., coaxially disposed within) the liquid supply conduit 38, the liquid exhaust conduit 36 can in some aspects be disposed around the liquid supply conduit 38. In addition, in various aspects, the supply and exhaust conduits 38, 36 can have a variety of other relative orientations (e.g., side-by-side, end-to-end), but are generally configured that the outlet end of the supply conduit 38 and the inlet end of the exhaust conduit 36 deliver liquid to and remove liquid from, respectively, a sampling space at the open end 32***d* of the sampling probe 30.

As shown in FIG. 1, the outlet end 36*a* of the liquid exhaust conduit 36 is in fluid communication with the jet pump assembly 20 such that the liquid from the sampling probe 30 containing the analytes of interest can be entrained within a motive fluid provided from a motive fluid source 21 for delivery to the ion source 40. The motive fluid can comprise a variety of fluids amenable to ionization (e.g., the same or different fluid as provided by the liquid supply source 31) although the motive fluid source 21 may, in some aspects, be a pressurized source. In various aspects, the motive fluid can be in a liquid state, a gas state, or a mixture thereof. As discussed otherwise herein and will be appreciated by a person skilled in the art, the motive fluid can be discharged (e.g., through a nozzle 22) under pressure into a suction chamber 24 disposed adjacent the outlet end of the liquid exhaust conduit 36 such that the liquid from the liquid exhaust conduit 36 is drawn into a suction chamber 24 of the jet pump assembly 20 and mixed with the motive fluid so as to form a sample mixture (e.g., the liquid from the sampling probe 30 mixed with the motive fluid) that is transported to the ion source 40 via a sample conduit 26 extending from the jet pump.

It will thus be appreciated that the jet pump assembly 20 can control the volumetric flow rate out of and through the liquid exhaust conduit 36 as well as through the sample conduit 26. Wherein the volumetric flow rate is provided to the open end 32*d* through the liquid supply conduit 38 (e.g., through an HPLC pump (not shown)) and wherein the volumetric flow rate of the liquid through the liquid exhaust conduit 36 can be controlled via the jet pump assembly 20, these volumetric flow rates can be selected to be the same or different from one another so as to control the movement of fluid throughout the system. For example, as discussed in further detail below, the volumetric flow rate through the liquid supply conduit 38 can be temporarily increased relative to the volumetric flow rate through the liquid exhaust conduit 36 (e.g., after receiving a specimen) such that liquid in the sampling space overflows from the open end 32*d* of the sampling probe 30 to clean any residual sample deposited by the withdrawn substrate and/or to prevent any airborne material from being transmitted into the liquid exhaust conduit 36. In other aspects, the relative volumetric flow rates can be adjusted such that the fluid flow is temporarily decreased upon insertion of the substrate so as to concentrate the desorbed analytes in a smaller volume of desorption solvent.

With continued reference to FIG. 1, the ionization chamber 12 can be maintained at about atmospheric pressure, though in some embodiments, the ionization chamber 12 can be evacuated to a pressure lower than atmospheric pressure. The ionization chamber 12, within which analytes within the sample mixture that is discharged from the electrospray electrode 44 can be ionized, is separated from a gas curtain chamber 14 by a plate 14*a* having a curtain plate aperture 14*b*. As shown, a vacuum chamber 16, which houses the mass analyzer 60, is separated from the curtain chamber 14 by a plate 16*a* having a vacuum chamber sampling orifice 16*b*. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

The ion source 40 can have a variety of configurations but is generally configured to generate ions from analyte(s) contained within the sample mixture received from the jet pump assembly 20. In the exemplary embodiment depicted in FIG. 1, an electrospray electrode 44, which can comprise a capillary fluidly coupled to the sample conduit 24 extending from the suction chamber 26, terminates in an outlet end that at least partially extends into the ionization chamber 12 and discharges the sample mixture therein. As will be appreciated by a person skilled in the art in light of the present teachings, the outlet end of the electrospray electrode 44 can atomize, aerosolize, nebulize, or otherwise discharge (e.g., spray with a nozzle) the sample mixture into the ionization chamber 12 to form a sample plume 50 comprising a plurality of micro-droplets generally directed toward (e.g., in the vicinity of) the curtain plate aperture 14*b* and vacuum chamber sampling orifice 16*b*. As is known in the art, analytes contained within the micro-droplets can be ionized (i.e., charged) by the ion source 40, for example, as the sample plume 50 is generated. By way of non-limiting example, the outlet end of the electrospray electrode 44 can be made of a conductive material and electrically coupled to a pole of a voltage source (not shown), while the other pole of the voltage source can be grounded. Micro-droplets contained within the sample plume 50 can thus be charged by the voltage applied to the outlet end such that as the liquid within the droplets evaporates during desolvation in the ionization chamber 12 such that bare charged analyte ions are released and drawn toward and through the apertures 14*b*, 16*b* and focused (e.g., via one or more ion lens) into the mass analyzer 60. Though the ion source probe is generally described herein as an electrospray electrode 44, it should be appreciated that any number of different ionization techniques known in the art for ionizing liquid samples and modified in accordance with the present teachings can be utilized as the ion source 40. By way of non-limiting example, the ion source 40 can be an electrospray ionization device, a nebulizer assisted electrospray device, a chemical ionization device, a nebulizer assisted atomization device, a photoionization device, a laser ionization device, a thermospray ionization device, or a sonic spray ionization device.

It will also be appreciated by a person skilled in the art and in light of the teachings herein that the mass analyzer 60 can have a variety of configurations. Generally, the mass analyzer 60 is configured to process (e.g., filter, sort, dissociate, detect, etc.) sample ions generated by the ion source 40. By way of non-limiting example, the mass analyzer 60 can be a triple quadrupole mass spectrometer, or any other mass analyzer known in the art and modified in accordance with the teachings herein. It will further be appreciated that any number of additional elements can be included in the mass spectrometer system including, for example, an ion mobility spectrometer (e.g., a differential mobility spectrometer) that is configured to separate ions based on their mobility through a drift gas rather than their mass-to-charge ratio. Additionally, it will be appreciated that the mass analyzer 60 can comprise a detector that can detect the ions which pass through the analyzer 60 and can, for example, supply a signal indicative of the number of ions per second that are detected.

Figure 2:
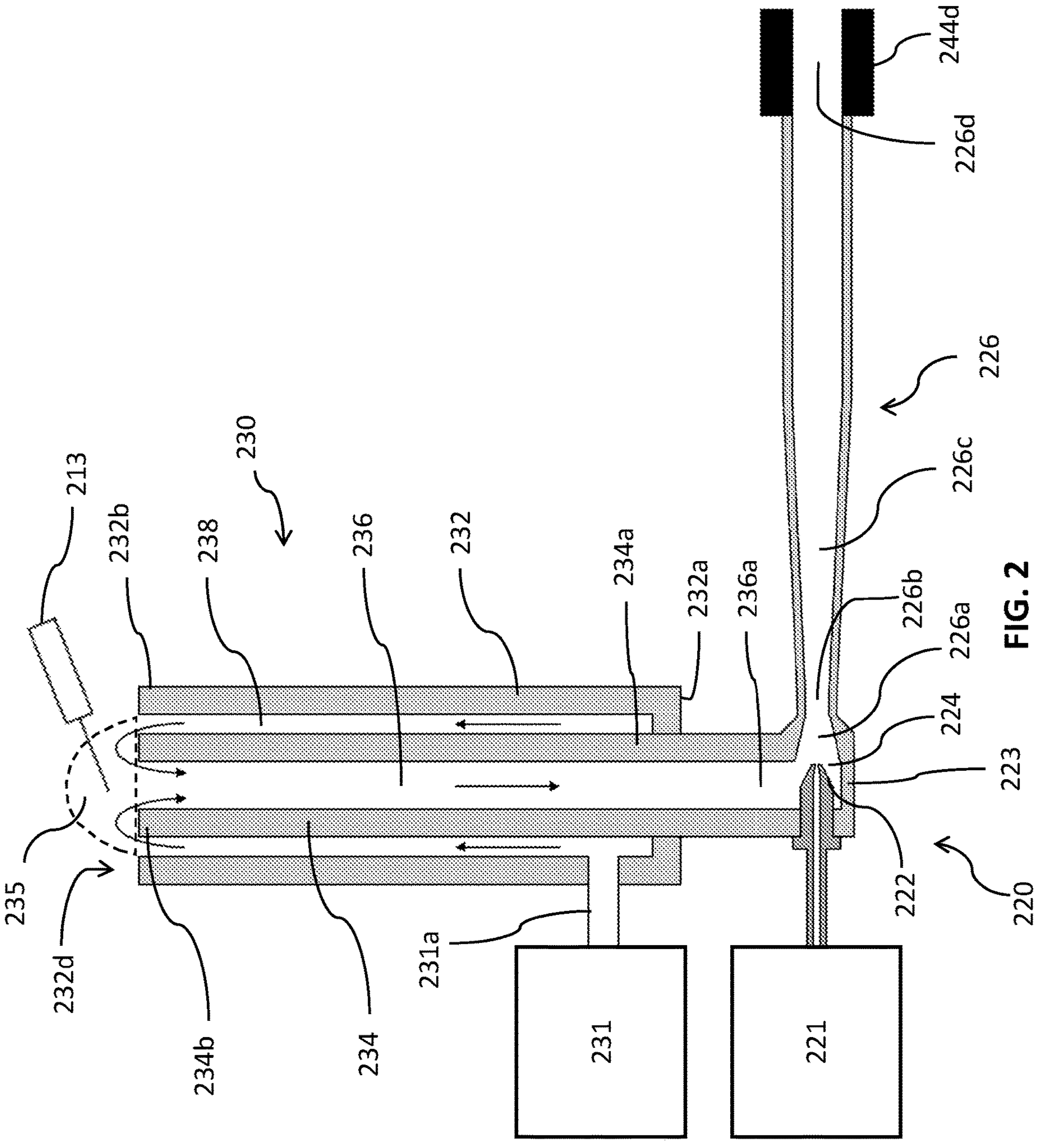
FIG. 2 schematically illustrates in additional detail an exemplary sampling probe and jet pump assembly in accordance with various aspects of the applicant's teachings.

With reference now to FIG. 2, an exemplary sampling probe 230 and jet pump assembly 220 in accordance with various aspects of the present teachings is schematically depicted in additional detail. As shown in FIG. 2, the substrate sampling probe 230 includes an outer tube (e.g., outer capillary tube 232) extending from a proximal end 232*a* to a distal end 232*b* and an inner tube (e.g., inner capillary tube 234) disposed co-axially within the outer capillary tube 232. The inner capillary tube 234 also extends from a proximal end 234*a* to a distal end 234*b*. The inner capillary tube 234 comprises an axial bore providing a fluid channel therethrough, which as shown in the exemplary embodiment of FIG. 2 defines a liquid exhaust conduit 236 through which liquid can be transmitted from the sampling space 235 at the open end 232*d* of the sampling probe 230 to the jet pump assembly 220. On the other hand, the annular space between the inner surface of the outer capillary tube 232 and the outer surface of the inner capillary tube 234 can define a liquid supply conduit 238 extending from an inlet end coupled to the liquid supply source 231 (e.g., via conduit 231*a*) to an outlet end adjacent the distal end 232*b* of the outer capillary tube 232.

As noted above, the liquid supply conduit 236 can deliver liquid from the liquid supply source 231 at a first volumetric flow rate to the open end 232*d* of the housing, as shown by the upward arrow in FIG. 2. Additionally, as discussed below, the jet pump assembly 220 in fluid connection with the outlet end 236*a* of the liquid exhaust conduit 236 can be configured to remove liquid from the open end 232*d* as indicated by the downward arrow in FIG. 2 at a second volumetric flow rate. As indicated by the curved arrows of FIG. 2, the fluid supply conduit 238 is in fluid communication with the fluid exhaust conduit 236 via a sampling space 235 (e.g., liquid dome) at the open end 232*d* of the sampling probe 230. In this manner and depending on the fluid flow rates of the respective channels, fluid that is delivered to the distal fluid chamber 235 through the fluid supply conduit 238 can enter the inlet end of the fluid exhaust conduit 236 for transmission to its outlet end 236*a* and subsequently to the ion source via the jet pump assembly 220.

The jet pump assembly 220, schematically depicted in FIG. 2, is generally configured to draw (e.g., via suction) a flow of liquid from the outlet end 236*a* of the fluid exhaust conduit 236 and mix it with a motive fluid to generate a sample mixture for delivery to an ion source. As shown, the example jet pump assembly 220 comprises a jet pump body 223 defining a chamber 224, the chamber 224 having two fluid inlets and a fluid outlet. In particular, the outlet end 236*a* of the fluid exhaust conduit 236 comprises (or is fluidically coupled) to one fluid inlet (e.g., a suction port) of the chamber 223 and a nozzle 222 comprises the other fluid inlet. The nozzle 222 is coupled to a motive fluid supply 221 that is configured to hold a pressurized motive fluid therein. As shown, the nozzle 222 is configured to direct its discharge along the axis of the sample conduit 226 discussed below. As the motive fluid is accelerated through and discharged from the nozzle 222 (e.g., the nozzle can comprise an internal conduit that tapers along a length of fluid flow), the static pressure of the motive flow exiting the nozzle 222 drops, which also decreases the static pressure within the suction chamber 224. The suction pressure, which is generated in the chamber 224, thereby draws the liquid within the exhaust fluid conduit 236 into the chamber 224. The resulting sample mixture, comprising the motive flow and the exhaust liquid, exits the chamber 224 via the sample conduit 226. As shown in FIG. 2, the initial upstream portion of the sample conduit can, in some aspects, represent a tapered, converging mixing chamber 226*a* exhibiting a decreasing cross-sectional area along its length such that the motive flow and the liquid are further mixed and the static fluid pressure further reduced and the fluid velocity increased.

As shown in FIG. 2, following or as an alternative to the converging portion 226*a* at the upstream end of the sample conduit 226, a throat portion 226*b* having a constant cross-sectional area can be provided, the throat portion 226*b* having a smaller cross-sectional area than the chamber 224 at the position of the discharge from the nozzle 222. In this manner, the static pressure of the fluid can increase slightly relative to the suction chamber 224. Following the throat portion 226*b*, the sample mixture flow can enter a tapered, diverging portion 226*c* of the sample conduit in which the cross sectional area increases along the length of the fluid flow direction. The diverging portion 226*c* provides an expansion of the sample mixture, thereby decreasing the velocity of the sample mixture and providing a recovery of the static pressure of the sample mixture. This increase in the static pressure of the sample mixture allows the sample mixture to be delivered against a pressure head greater than atmospheric pressure at the liquid/air interface of the open end 232*d*.

As shown in FIG. 2, in some aspects, the outlet end 226*d* of the sample conduit 226 can comprise an electrically conductive electrode 244*d* that can be coupled to a voltage source. In this manner, the electrode 244*d* be energized so as to ionize analytes within the sample mixture as it is discharged from the outlet end 226*d* into the ionization chamber.

In some aspects, the system can be configured such that the pressure and/or volumetric flow rates within the channels can be adjusted. By way of example, in some aspects, a pressure regulator (not shown) of the jet pump assembly 220 can be operated so as to adjust the pressure of the motive fluid discharged from the nozzle 222, thereby adjusting the suction force provided at the outlet end 236*a* of the liquid exhaust conduit 236, and ultimately, the characteristics of the flow of the sample mixture therethrough.

As depicted in FIG. 2, for example, the upper edge of the domed sampling space 235 (shown in phantom) represents an example of a liquid/air interface between the fluid within the sampling space 235 and the atmosphere when the volumetric flow rate input via the liquid supply conduit 238 exceeds the volumetric flow rate removed via the liquid exhaust conduit 236. As schematically shown, such a domed liquid/air interface may be preferable during insertion of a SPME substrate 213, for example, such that the liquid in the sampling space 235 can fully surround and/or receive a portion of the substrate to which the analyte(s) of interest are adhered. Indeed, it will be appreciated by a person skilled in the art that the specific surface profile at the liquid/air interface can be a function of the relative volumetric flow rates, as well as the size of the various conduits, liquid temperature, surface tension, and other experimental conditions. However, the level of the fluid along the central longitudinal axis of the sampling probe (e.g., relative to the distal end 234*b* of the inner capillary 234) can generally be increased (or can overflow from the open end 232*d*) by increasing the volumetric flow rate of fluid through the liquid supply conduit 238, by decreasing the volumetric flow rate of fluid out of the sampling space 235 (e.g., via liquid exhaust conduit 236), or some combination of the two. By way of example, a substantially planar liquid/air interface can be achieved when the volumetric flow rates are approximately equal. However, when the liquid delivery rate provided by the liquid supply source 231 is relatively low compared with the liquid removal rate due to the aspiration force generated by the jet pump assembly 220, for example, the liquid/air interface may exhibit a concave, convex, or vortex surface profile. In some exemplary aspects, a planar or vortex interface may be particularly useful when the specimen comprises a drop (e.g., from a dropper 13 as in FIG. 1).

In various example aspects, the nozzle 222 may be configured to discharge the motive fluid into the suction chamber 224 at a drive pressure in a range from about 0.1 psi to about 15,000 psi (e.g., about 1000 psi, about 10,000 psi, from about 0.1 psi to about 10,000 psi, from about 1000 psi to about 10,000 psi) so as to control the fluid flow through the sample conduit 226. For example, in some aspects, a pressure regulator (not shown) may be configured to adjust the pressure of the motive fluid discharged into the suction chamber 224 so as to adjust the suction pressure drop provided to the outlet end 236*a* of the liquid exhaust conduit 236. It will be appreciated, for example, that by increasing the drive pressure of the motive fluid and/or the fluid velocity of the motive fluid through the nozzle 222, additional suction force may be produced to increase the static pressure of the sample mixture (e.g., to a pressure greater than one atmosphere as at the liquid/air interface) within the sample conduit 226. By way of example, the pressure of the sample mixture within the sample conduit 226 may be increased to be in a range from about 0.1 psi to about 10000 psi (e.g., about 1000 psi, from about 0.1 psi to about 1000 psi).

In addition, it will be appreciated in light of the present teachings, that there is a case where the relatively high fluid velocity (but low volumetric flow rate) of the motive fluid discharged from the nozzle 222 of the jet pump assembly 220 may effectively pump the liquid from the sampling space 235 without substantially increasing dilution of the analyte containing liquid from the liquid exhaust conduit. By way of example, the volumetric flow rate through the nozzle 222 may be in a range of about 25% less than the volumetric flow rate through the liquid exhaust conduit 236, while nonetheless increasing the static pressure within the sample conduit 226. In some example aspects, the volumetric flow rate of motive fluid through the nozzle 222 may be in a range of about 0.01 mL/min to about 10 mL/min while the volumetric flow rate of the liquid through the outlet end 236*a* of the exhaust conduit 236 may be in a range of about 0.1 mL/min to about 20 mL/min.

The jet pump assembly 220 can have a variety of configurations, but may in some aspects, be characterized by a ratio of the cross-sectional area of the nozzle 222 to the cross-sectional area of the throat portion 226*b* between about 0.1 and about 0.9, with some particularly efficient examples utilizing a ratio of about 0.3. The ratio of pumped flow to motive (drive) flow may also be an important design consideration, and may be in a range of between about 0.05 and about 2.4, for example. It will be appreciated that as this ratio increases, the ability to operate against opposing pressure drops. These relationships can be illustrated as follows, by way of non-limiting example: operating a motive flow through a nozzle 222 having an inner diameter of 0.1 mm at 100 psi pressure drop would allow evacuation of the sampling space 235 and flow through the liquid exhaust conduit 236 at a rate of about 12 mL/min, where the combined flow would flow through the throat portion 226*b* having an inner diameter of 0.33 mm against a resisting pressure of about 30 psi. Alternatively, operating at 3 mL/min flow from the sampling space 235 would allow the combined flow against a resisting pressure of about 80 psi. In contrast, a conventional Venturi driven open port may only allow operation against about 10 psi resistive pressure.

Figure 3:
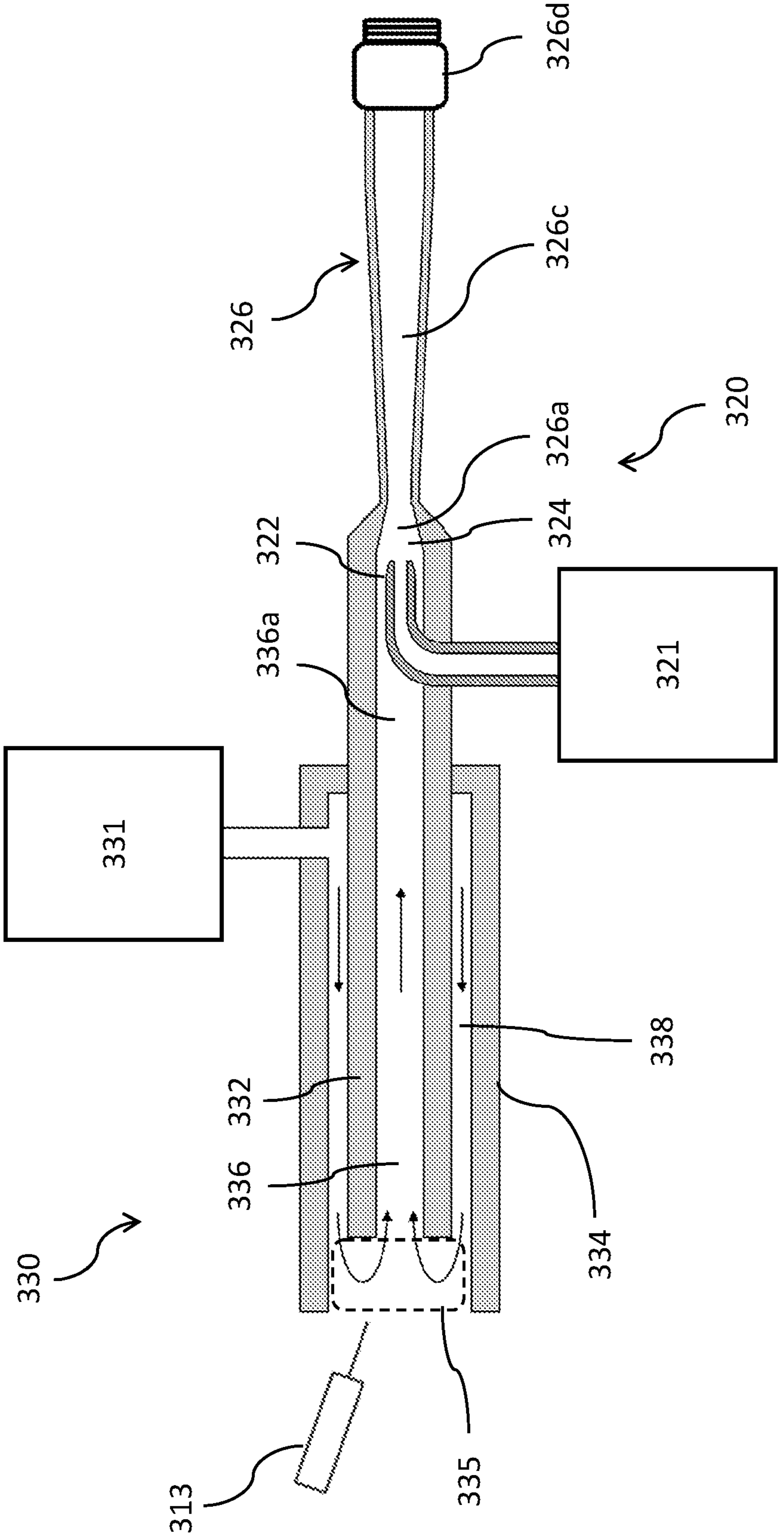
FIG. 3 schematically illustrates another exemplary sampling probe and jet pump assembly in accordance with various aspects of the applicant's teachings.

With reference now to FIG. 3, another exemplary sampling probe 330 and jet pump assembly 320 in accordance with various aspects of the present teachings is schematically depicted. The sampling probe 330 is similar to the sampling probe 230 of FIG. 2 in that a liquid supply conduit 338 is configured to deliver liquid from the liquid supply source 331 to a sampling space 335 having a liquid/air interface, which liquid in the sampling space 335 can then be removed via a liquid exhaust conduit 336 to an outlet end 336*a* in fluid communication with a suction chamber 324 of the jet pump assembly 320. The sampling probe 330 differs, however, in that the distal end of the inner capillary 332 is recessed relative to the distal end of the capillary tube 334. In this manner, the sampling space 335 through which liquid flows from the liquid supply conduit 338 to the liquid exhaust conduit 336 may be within the outer capillary 334 (and distal to the distal end of the inner capillary 332) such that a specimen (e.g., SPME substrate 313) may be inserted therein despite the substantially planar liquid/air interface.

Likewise, the jet pump assembly 320 of FIG. 3 is similar to the jet pump assembly 220 of FIG. 2, but differs in the orientation of the suction port (i.e., fluidly coupled to the outlet end 336*a* of the liquid exhaust conduit 336) and the nozzle 322. In particular, the suction port is disposed around the nozzle 322, which is configured to discharge the motive fluid 321 into the suction chamber 324 along the axis of the sample conduit 326. As above, as the motive fluid is accelerated through and discharged from the nozzle 322, the static pressure of the motive flow exiting the nozzle 322 drops, which also decreases the static pressure within the suction chamber 324, thereby drawing liquid within the exhaust fluid conduit 336 into the chamber 324. As shown in FIG. 3, the initial upstream portion of the sample conduit 326 can represent a tapered, converging mixing chamber 326*a* exhibiting a decreasing cross-sectional area along its length. Thereafter, the sample mixture flow can enter a tapered, diverging portion 326*c* in which the cross sectional area increases along the length of the fluid flow direction, thereby providing an expansion of the sample mixture to allow a recovery of the static pressure of the sample mixture.

As shown in FIG. 3, in some aspects, the sample conduit 326 may terminate in a liquid coupler 326*d*, which enables coupling with a corresponding coupler, for example, such that the sampling probe 330 and jet pump assembly 320 can be coupled to an ion source to deliver the sample mixture thereat. It will be appreciated that any fluidic coupling mechanism known or hereafter developed may be utilized to form a fluid pathway between the jet pump assembly 320 and an ion source.

Figure 4:
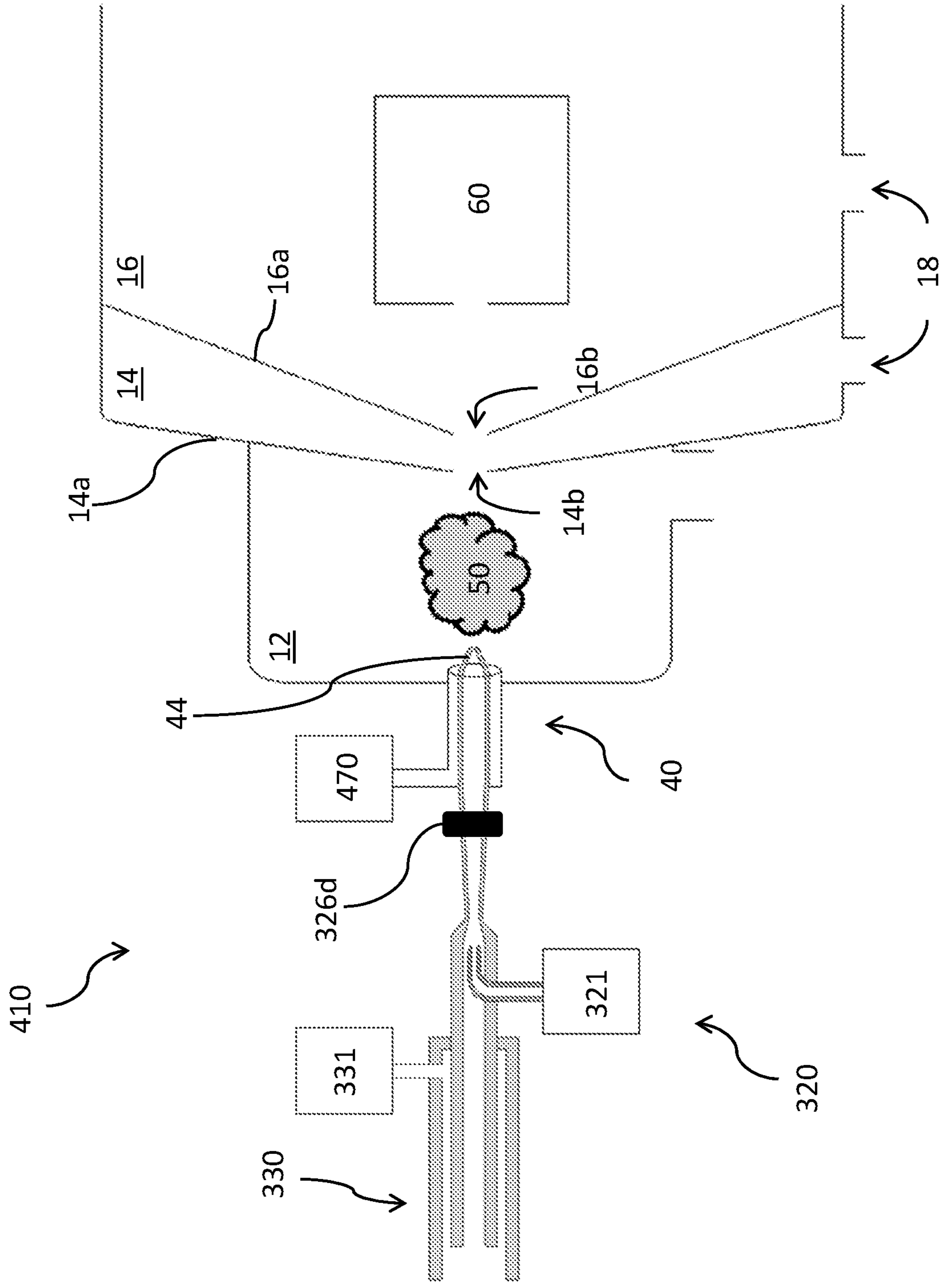
FIG. 4, in a schematic diagram, illustrates another exemplary mass spectrometer system incorporating the sampling probe and jet pump assembly of FIG. 3 in accordance with various aspects of the applicant's teachings.

FIG. 4 depicts the example sampling probe 330 and jet pump assembly 320 of FIG. 3 coupled to an ion source 40 via the liquid coupler 326*d* in accordance with various aspects of the present teachings. As shown, the system 410 is configured to ionize and mass analyze analytes from a specimen received through a liquid/air interface of the sampling probe 330. In particular, the ion source 40 is configured to discharge the sample mixture into the ionization chamber 12 such that a mass analyzer 60 downstream of the ionization chamber 12 can process and/or detect the generated ions. The system 410 is similar to that depicted in FIG. 1, but differs in that the system 410 also includes a source 470 of nebulizer gas that is configured to surround the discharge end 44 of the ion source to shape the sample plume and/or assist in desolvation. However, whereas some open port probes known in the art also utilize the nebulizer gas to drive the sample flow from the open port via the venturi effect, the system of FIG. 4 allows the jet pump assembly 320 to control fluid flow conditions within the probe 330, while the flow rate of nebulizer gas, for example, may be optimized to improve ionization conditions (e.g., irrespective of the desired sample flow rate). The ionization chamber 12 may also include a heater (not shown) to aid desolvation of the sample plume 50.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The invention claimed is:

1. A system for analyzing a chemical composition of a specimen, comprising:

a sampling probe comprising:

an outer housing having an open end;

a liquid supply conduit within the housing, the liquid supply conduit extending from an inlet end for coupling to a liquid supply source to an outlet end configured to deliver liquid to a sampling space at the open end of the housing, wherein the sampling space comprises a liquid-air interface for receiving a specimen within the liquid in the sample space; and a liquid exhaust conduit within the housing, the liquid exhaust conduit extending from an inlet end in fluid communication with the sampling space to an outlet end, and the liquid exhaust conduit being configured to transport liquid from the sampling space through the outlet end of the liquid exhaust conduit at a flowrate range of 0.1 mL/min to 20 mL/min;

a jet pump body defining a suction chamber in fluid communication with the outlet end of the liquid exhaust conduit;

a nozzle configured to discharge a motive liquid into the suction chamber at a pressure greater than about one atmosphere at a flowrate range of 0.01 mL/min to 10 mL/min; and a sample conduit extending from the suction chamber to an outlet end, the sample conduit configured to transport a sample mixture, including the motive liquid and liquid from the liquid exhaust conduit, from the suction chamber to an ionization chamber in communication with a sampling orifice of a mass spectrometer, wherein the sample conduit comprises a converging portion configured to receive the sample mixture from the suction chamber and mix the sample mixture therein, the converging portion extending from an upstream end adjacent the suction chamber to a downstream end and exhibiting a decreasing cross-sectional area along a length thereof, and the converging portion exhibiting a decreased cross-sectional area relative to a cross-sectional area of the suction chamber, and wherein discharge of the motive liquid into the suction chamber is configured to draw liquid from the liquid exhaust conduit so as to form the sample mixture.

2. The system of claim 1, wherein the outlet end of the sample conduit extends into the ionization chamber and is electrically conductive.

3. The system of claim 1, wherein the outlet end of the sample conduit is configured to couple to an ion source probe for discharging the sample mixture into the ionization chamber, wherein the ion source probe is a nebulizer assisted ESI probe and nebulizer gas control is independent of sample flowrate control.

4. The system of claim 1, wherein the sample conduit comprises a diffuser portion extending from an upstream end to a downstream end and exhibiting an increasing cross-sectional area along a length thereof, the diffuser portion being disposed downstream of the converging portion.

5. The system of claim 1, wherein the sample conduit comprises a throat between the converging portion and a diffuser portion disposed downstream of the converging portion, the throat exhibiting a substantially constant cross-sectional area along a length thereof, the cross-sectional area being less than a cross-sectional area of the upstream end of the converging portion and a downstream end of the diffuser portion.

6. The system of claim 1, wherein the nozzle is configured to discharge the motive liquid into the suction chamber at a drive pressure in a range from about 0.1 psi to about 15,000 psi.

7. The system of claim 6, further comprising a pressure regulator configured to adjust the pressure of the motive liquid discharged into the suction chamber.

8. The system of claim 1, wherein a pressure of the sample mixture within at least a portion of the sample conduit is greater than one atmosphere.

9. The system of claim 8, wherein the pressure of the sample mixture within the portion of the sample conduit is in a range from about 0.1 psi to about 10,000 psi.

10. The system of claim 1, wherein the volumetric flow rate of motive liquid through the nozzle is less than the volumetric flow rate of the liquid through the outlet end of the exhaust conduit.

11. The system of claim 1, wherein the volumetric flow rate of motive liquid through the nozzle is equal to or greater than the volumetric flow rate of the liquid through the outlet end of the exhaust conduit.

12. The system of claim 1, wherein the sampling probe further comprises an inner capillary tube at least partially disposed within the outer housing, wherein said inner capillary tube defines one of the supply conduit and the exhaust conduit, and wherein and a space between an outer wall of the inner capillary tube and an inner wall of the outer housing defines the other of the supply conduit and the exhaust conduit.

13. The system of claim 12, wherein the outer housing comprises an outer capillary tube extending from a proximal end to a distal end adjacent to the sampling space.

14. The system of claim 13, wherein a distal end of the inner capillary tube is recessed relative to the distal end of the outer housing.

15. The system of claim 1, wherein the specimen comprises a fluid droplet.

16. The system of claim 1, wherein the specimen comprises a sample substrate having one or more analytes adsorbed thereto, and wherein the liquid supply source comprises desorption solvent.

17. The system of claim 1, further comprising the ion source probe, the ionization chamber, and the mass spectrometer system, wherein the ion source probe is in fluid communication with the outlet end of the sample conduit and comprises a terminal end disposed in the ionization chamber, wherein analytes contained within said sample mixture are configured to ionize as the sample mixture is discharged into the ionization chamber.

18. A method for performing chemical analysis of a specimen, comprising:

inserting the specimen into liquid within a sampling space of a sampling probe, the sampling probe comprising:

an outer housing having an open end;

a liquid supply conduit within the housing, the liquid supply conduit extending from an inlet end for coupling to a liquid supply source to an outlet end configured to deliver liquid to the sampling space at the open end of the housing, wherein the sampling space comprises a liquid-air interface through which the specimen is received within the liquid; and a liquid exhaust conduit within the housing, the liquid exhaust conduit extending from an inlet end in fluid communication with the sampling space to an outlet end, and the liquid exhaust conduit being configured to transport liquid from the sampling space through the outlet end of the liquid exhaust conduit at a flowrate range of 0.1 mL/min to 20 mL/min;

entraining the liquid from the outlet end of the liquid exhaust conduit within a motive liquid to form a sample mixture, wherein the entraining the liquid from the outlet end of the liquid exhaust conduit within a motive liquid to form a sample mixture comprises:

discharging the motive liquid into a suction chamber of a jet pump body through a nozzle at a pressure greater than about one atmosphere at a flowrate range of 0.01 mL/min to 10 mL/min, so as to draw liquid from the liquid exhaust conduit into the suction chamber; and transporting the sample mixture through a sample conduit extending from the suction chamber to an outlet end, the sample conduit comprising a converging portion that receives the sample mixture from the suction chamber and mixes the sample mixture therein, the converging portion extending from an upstream end adjacent the suction chamber to a downstream end and exhibiting a decreasing cross-sectional area along a length thereof, and the converging portion exhibiting a decreased cross-sectional area relative to a cross-sectional area of the suction chamber;

discharging said sample mixture from the sample conduit into an ionization chamber so as to ionize one or more analyte species within the sample mixture; and performing mass spectrometric analysis on said one or more ionized analyte species.

19. A system for analyzing a chemical composition of a specimen, comprising:

a sampling probe comprising:

an outer housing having an open end;

a liquid supply conduit within the housing, the liquid supply conduit extending from an inlet end for coupling to a liquid supply source to an outlet end configured to deliver liquid to a sampling space at the open end of the housing, wherein the sampling space comprises a liquid-air interface for receiving a specimen within the liquid in the sample space; and a liquid exhaust conduit within the housing, the liquid exhaust conduit extending from an inlet end configured to transport liquid from the sampling space to an outlet end;

a jet pump body defining a suction chamber in fluid communication with the outlet end of the liquid exhaust conduit;

a nozzle configured to discharge a motive liquid into the suction chamber at a pressure greater than about one atmosphere;

a sample conduit extending from the suction chamber to an outlet end, the sample conduit configured to transport a sample mixture from the suction chamber;

an ion source configured to receive the sample mixture from the sample conduit, and configured to discharge the sample mixture into an ionization chamber in communication with a sampling orifice of a mass spectrometer so as to form a sample plume; and a source of nebulizer gas surrounding a discharge end of the ion source and configured to generate a flow of nebulizer gas that surrounds the sample mixture as the sample mixture is discharged into the ionization chamber, to thereby shape and/or assist in desolvation of the sample plume, wherein discharge of the motive liquid into the suction chamber is configured to draw liquid from the liquid exhaust conduit so as to form the sample mixture.

* * * * *